US010429190B2

(12) United States Patent
Surnilla et al.

(10) Patent No.: US 10,429,190 B2
(45) Date of Patent: Oct. 1, 2019

(54) VEHICLE LOCALIZATION BASED ON WIRELESS LOCAL AREA NETWORK NODES

(71) Applicant: Ford Global Technologies, LLC, Dearborn, MI (US)

(72) Inventors: Gopichandra Surnilla, West Bloomfield, MI (US); Daniel Makled, Dearborn, MI (US); Michael Mcquillen, Warren, MI (US); Ali Ahmad Ayoub, Windsor (CA); Jeremy Ferack, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 15/346,416

(22) Filed: Nov. 8, 2016

(65) Prior Publication Data

US 2018/0128623 A1   May 10, 2018

(51) Int. Cl.
*G01C 21/10* (2006.01)
*G01C 21/20* (2006.01)
*G01C 21/34* (2006.01)
*H04B 17/318* (2015.01)
*H04W 64/00* (2009.01)
*H04W 84/12* (2009.01)

(52) U.S. Cl.
CPC .............. *G01C 21/20* (2013.01); *G01C 21/10* (2013.01); *G01C 21/34* (2013.01); *H04W 64/006* (2013.01); *H04B 17/318* (2015.01); *H04W 84/12* (2013.01)

(58) Field of Classification Search
CPC ....... G01C 21/20; G01C 21/34; H04B 17/318; H04W 64/006; H04W 64/12
See application file for complete search history.

(56) References Cited

U.S. PATENT DOCUMENTS

| 7,209,754 | B2 | 4/2007 | Niu et al. |
| 8,244,274 | B2 | 8/2012 | Grigsby et al. |
| 8,401,713 | B2 | 3/2013 | Kellum et al. |
| 8,983,493 | B2 | 3/2015 | Brachet et al. |
| 8,995,414 | B2 | 3/2015 | Chabbra et al. |

(Continued)

FOREIGN PATENT DOCUMENTS

CA      2725250 A1    6/2012

OTHER PUBLICATIONS

A general Gaussian Mixture Approach for Range-only Mapping using Multiple Hypothesis—F. Caballero, L Merino and A. Ollero.

(Continued)

*Primary Examiner* — Robert T Nguyen
(74) *Attorney, Agent, or Firm* — Frank Lollo; Neal, Gerber & Eisenberg LLP; James P. Muraff (57) ABSTRACT

Method and apparatus are disclosed for vehicle localization based on wireless local area network nodes. An example disclosed vehicle includes a wireless network controller and a location tracker. In response to losing reception of GPS signals, the location tracker scans for wireless network nodes via the wireless network controller, and when second locations of the wireless network nodes are stored in memory, determines a current location of the vehicle based on a particle filtering technique and received signal strength measurements from the wireless network nodes.

14 Claims, 6 Drawing Sheets

(56) References Cited

U.S. PATENT DOCUMENTS

| | | | |
|---|---|---|---|
| 9,113,310 | B2 | 8/2015 | Yang et al. |
| 9,250,081 | B2 | 2/2016 | Gutmann et al. |
| 9,258,679 | B1 | 2/2016 | Williams et al. |
| 9,316,719 | B1 | 4/2016 | Sternowski |
| 9,344,989 | B2 | 5/2016 | Varoglu et al. |
| 2006/0095349 | A1 | 5/2006 | Morgan et al. |
| 2008/0176583 | A1* | 7/2008 | Brachet .............. G01S 5/0236 455/456.3 |
| 2012/0081248 | A1 | 4/2012 | Kennedy et al. |
| 2013/0138337 | A1 | 5/2013 | Pack |
| 2014/0120950 | A1* | 5/2014 | Fulton ................. G01S 5/0252 455/456.1 |
| 2014/0141796 | A1* | 5/2014 | Marti .................. G01S 5/0252 455/456.1 |
| 2014/0171114 | A1 | 6/2014 | Marti et al. |
| 2014/0286325 | A1 | 9/2014 | Kang et al. |
| 2015/0142248 | A1 | 5/2015 | Han et al. |
| 2015/0208207 | A1 | 7/2015 | Ye et al. |
| 2015/0327214 | A1* | 11/2015 | Buck, Jr. ............. H04W 4/029 455/456.1 |
| 2016/0062949 | A1* | 3/2016 | Smith .................. H04W 4/02 702/150 |
| 2016/0075335 | A1 | 3/2016 | Arndt et al. |
| 2016/0109551 | A1* | 4/2016 | Faragher ............. G01S 5/0263 701/23 |
| 2016/0259032 | A1* | 9/2016 | Hehn ................... G01S 5/0289 |
| 2016/0349362 | A1* | 12/2016 | Rohr .................... G01S 13/86 |
| 2017/0023659 | A1* | 1/2017 | Bruemmer ........... G01S 5/0252 |
| 2018/0077534 | A1* | 3/2018 | Le Grand ............ H04W 4/029 |
| 2018/0164101 | A1* | 6/2018 | Villien ................. G01C 21/206 |

OTHER PUBLICATIONS

A particle Filtering Method for Wireless Sensor Network Localization with an Aerial Robot Beacon—F. Caballero, L. Merino, I. Maza and A. Ollero—2008 IEEE International Conference on Robotics and Automation Pasadena, CA, USA, May 19-23, 2008.

Collision Detection Using Received Signal Strength in FANETs—Rodolfo Barros Chiaramonte and Kalinka Regina Lucas Jaquie Castelo Branco—2014 International Conference on Unmanned Aircraft Systems (ICUAS) May 27-30, Orlando, FL, USA.

Sybil Nodes Detection Based on Received Signal Strength Variations within VANET—Mohamed Salah Bouassida, Gilles Guette, Mohamed Shawky, and Bertrand Ducourthial—International Journal of Network Security, vol. 9, No. 1, pp. 22-33, Jul. 2009.

Vehicular-to-Vehicular Channel Characterization and Measurement Results—Andres J. Campuzano, Herman Ferenandez, David Balaguer, Antonio Vila, Bernardo Bernardo—Clemente, Vincent M. Rodrigo—Penarrocha, Juan Reig, Alejandro Valero—Nogueira and Lorezno Rubio—University of Telecommunications and Multimedia Valencia.

Search Report dated Mar. 29, 2018 for GB Patent Application No. GB 1718177.7 (5 pages).

Lim, "Efficient Wireless Location Estimation through simultaneous L localization and mapping". 2009, Georgia Institute of Technology, Available athttps://smartech.gatech.edu/bitstreatn/handle/1853/28219/lim_yuxi_200905_phd.pdf [Accessed Mar. 23, 2018].

* cited by examiner

VEHICLE LOCALIZATION BASED ON WIRELESS LOCAL AREA NETWORK NODES

TECHNICAL FIELD

The present disclosure generally relates to vehicle navigation systems and, more specifically, vehicle localization based on wireless local area network nodes.

BACKGROUND

Increasingly, vehicles are being manufactured with global positioning system (GPS) receivers to provide a location of the vehicle. A navigation system of the vehicle uses the coordinates provided by the GPS receiver to place the vehicle into a pre-existing map in order to route the driver to a destination. However, in certain areas, such as in urban canyons, the signals from GPS satellites may become blocked or distorted. In such areas, vehicle navigation systems may not be able to accurately guide the vehicle along the route.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for vehicle localization based on wireless local area network nodes. An example disclosed vehicle includes a wireless network controller and a location tracker. In response to losing reception of GPS signals, the location tracker scans for wireless network nodes via the wireless network controller, and when second locations of the wireless network nodes are stored in memory, determines a current location of the vehicle based on a particle filtering technique and received signal strength measurements from the wireless network nodes.

An example method to determine a current location of a vehicle includes, in response to losing reception of GPS signals, scanning for wireless network nodes via a wireless network controller. Additionally, the example method includes, when second locations of the wireless network nodes are stored in memory, determining the current location of the vehicle based on a particle filtering technique and received signal strength measurements from the wireless network nodes.

An example tangible computer readable medium comprises instructions that, when executed by a processor, cause a vehicle to in response to losing reception of GPS signals, scan for wireless network nodes via a wireless network controller. When second locations of the wireless network nodes are stored in memory, the instructions cause the vehicle to determine the current location of the vehicle based on a particle filtering technique and received signal strength measurements from the wireless network nodes. Additionally, when the second locations of the wireless network nodes are not stored in the memory, the instructions cause the vehicle to determine the current location of the vehicle based on a simultaneous localization and mapping technique and the received signal strength measurements from the wireless network nodes.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Individuals and businesses operate wireless local area network nodes. In some areas, such as urban areas, a large number of the wireless local area network (WLAN) nodes may be operated in a relatively small area. As disclosed below, a location tracker of a vehicle determines its location based on messages received from the WLAN node in a geographical area. The vehicle includes a WLAN controller that broadcasts probe requests (sometimes referred to as "scanning."). In response to the probe requests, the WLAN nodes within range broadcast probe responses that include an identifier (e.g. media access control (MAC) address, a service set identifier (SSID), etc.) that identifies the wireless local area network node that broadcast the probe response. The probe response also includes a received signal strength measurement that measures the power level of the probe request when it reached the corresponding wireless local area network node. Alternatively, in some examples, the WLAN controller of the vehicle measures the received signal strength for each of the probe responses in, for example decibel-milliwatts (dBm). The location tracker determines distances from the WLAN nodes based on the measured received signal strength.

The location tracker operates differently depending on whether the locations (e.g., coordinates) of the WLAN nodes are known. In some areas, navigation data provided by a navigation system includes locations of the WLAN nodes associated with the identifier of WLAN nodes. In some examples, the locations of the WLAN nodes are determined through a process of detecting and triangulating the WLAN nodes by the provider of the navigation data. For example, from time-to-time, a vehicle (e.g., a car, a drone, etc.) may traverse an area detecting and triangulating the locations of the wireless WLAN nodes. Example methods of detecting the locations of the WLAN nodes are described in Caballero, Fernando, et al. "A particle filtering method for wireless sensor network localization with an aerial robot beacon" Robotics and Automation, 2008. ICRA 2008. IEEE International Conference on. IEEE, 2008, which in hereby incorporated by reference herein.

If the locations of the WLAN nodes are not known, the location tracker utilizes simultaneous localization and mapping (SLAM) techniques to build a map of the locations of the WLAN nodes while localizing the vehicle on the map. Using the SLAM techniques, starting with the last known position (e.g., from a global positioning system (GPS) receiver) the location tracker predicts current location using a motion model based on the speed of the vehicle and received signal strength measurements from the WLAN nodes. If the locations of the WLAN nodes are known, the location tracker utilizes a particle filtering technique to determine a most likely location of the vehicle with a confidence level. In some examples, the location tracker uses these techniques when signals from GPS satellites are not reliable (e.g., in urban canyons between tall buildings). Additionally, in some examples, location tracker uses these techniques to supplement the coordinates provided by GPS receiver when a high level of accuracy is desirable (current GPS Standard Positioning Service (SPS) Performance Standard indicates that 95% of the calculated locations are horizontally within 3.5 meters (11.5 feet) of the actual location of the GPS receiver).

Figure 1:
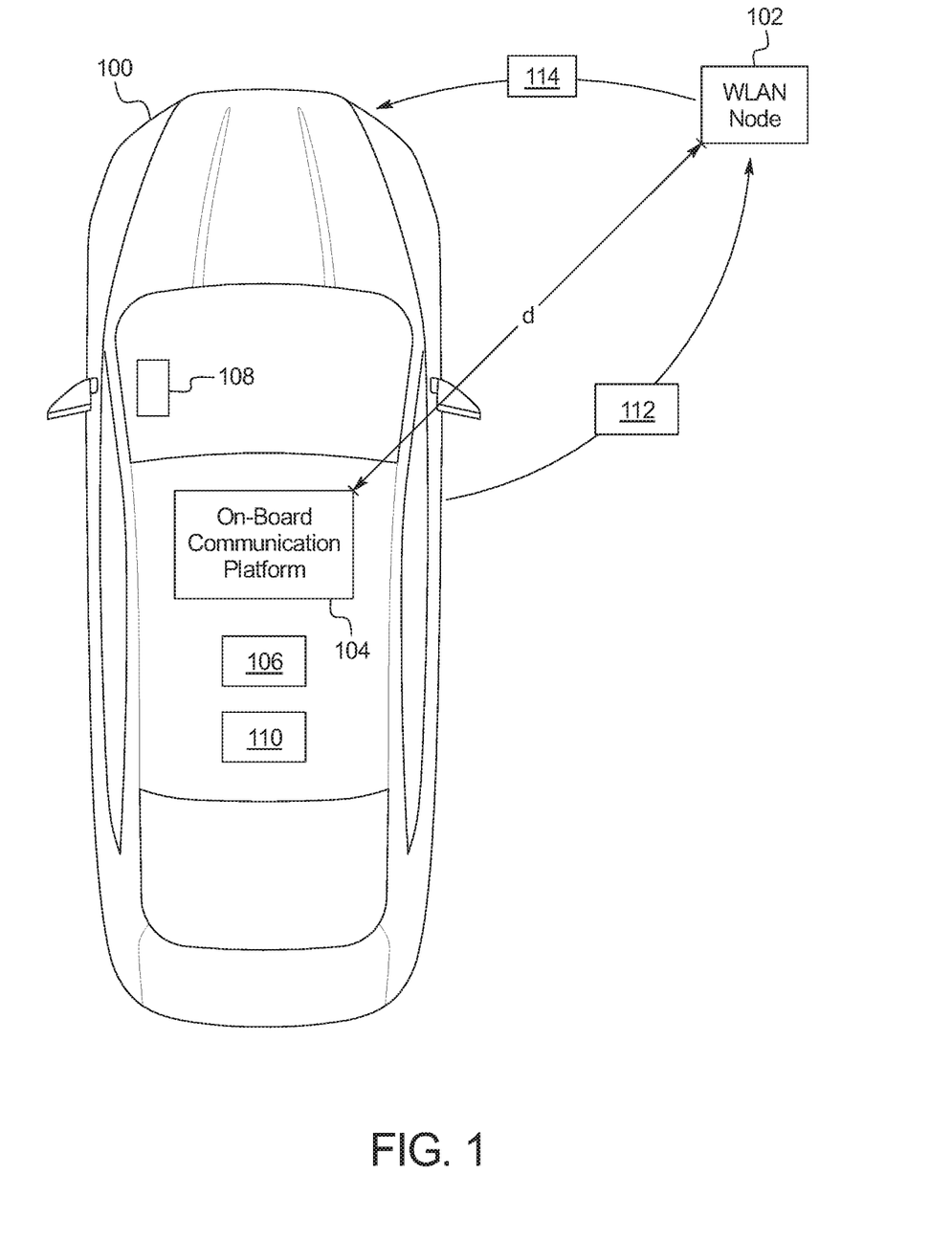
FIG. 1 illustrates a vehicle in communication with a wireless local area network node to localize the vehicle in accordance to the teachings of this disclosure.

FIG. 1 illustrates a vehicle 100 in communication with wireless local area network (WLAN) nodes 102 to localize the vehicle 100 in accordance to the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes the on-board communications platform 104, an example navigation system 106, a vehicle speed sensor 108, and an example location tracker 110.

The on-board communications platform 104 includes wireless network interfaces to enable communication the WLAN nodes 102. The on-board communications platform 104 also includes hardware (e.g., processors, memory, storage, antenna, etc.) and software to control the wireless network interfaces. In the illustrated example, the on-board communications platform 104 includes a WLAN controller that implements one or more local area wireless network protocols (including IEEE 802.11 a/b/g/n/ac or others). Additionally, in the on-board communications platform 104 includes a global positioning system receiver to provide the coordinates of the vehicle 100 when available. In some examples, the on-board communications platform 104 includes a cellular modem to communication to an external network (e.g., the Internet) via a standards-based protocol (e.g., Global System for Mobile Communications (GSM), Universal Mobile Telecommunications System (UMTS), Long Term Evolution (LTE), Code Division Multiple Access (CDMA), WiMAX (IEEE 802.16m); and Wireless Gigabit (IEEE 802.11ad), etc.).

The WLAN nodes 102 are devices (such as Wi-Fi® routers, etc.) that implement the WLAN protocols (including IEEE 802.11 a/b/g/n/ac, etc.). Often, the WLAN nodes 102 are maintained by individuals, business, and/or government entities to provide wireless access to a network (e.g., the Internet, etc.). To facilitate computing devices (e.g., mobile phones, tablets, smart watches, laptops, etc.) connecting the network, the WLAN node 102 broadcasts signals that may be detected by other devices (e.g., the on-board communications platform 104 of the vehicle 100) even if those devices do not establish a connection with the WLAN node 102.

The navigation system 106 displays a map stored in memory or retrieved from server on an external network. Additionally, the navigation system provides a route to navigate from a current pose (e.g., location and orientation) of the vehicle 100 to a destination. The current location of the vehicle may be provided by the GPS receiver and/or the location tracker 110. In some examples, the navigation system 106 provides navigation (e.g., locations of roads, parking lots, driveways, etc.) to the location tracker 110. Additionally, in some examples, the navigation data includes locations of the WLAN nodes 102 associated with their identifiers (e.g., the MAC address, etc.).

The vehicle speed sensor 108 measures the speed of the vehicle 100. In some examples, the vehicle speed sensor 108 may be a wheel speed sensor that determines the speed of the vehicle 100 based on the rotation of the wheels of the vehicle 100.

The location tracker 110 determines the location of the vehicle 100 based messages received from the WLAN nodes 102. As disclosed below, from time-to-time, the location tracker 110, via the on-board communications platform 104, broadcasts probe requests 112 and listens for probe responses 114 from the WLAN nodes within range. This process is sometimes referred to as "scanning." The probe responses 114 include the identifier of the corresponding WLAN node 102 and a received signal strength (RSS) measurement (in decibel-milliwatts. The location tracker 110 determines distances (d) of the vehicle 100 from the WLAN nodes 102 based on the RSS measurement. In some examples, the location tracker 110 determines the distances (d) in accordance with Equation (1) below.

$$d = 10^{-\frac{A}{10n} - \frac{RSS}{10n}} \qquad \text{Equation (1)}$$

In Equation (1) above, d is the second distance in meters, RSS is the received signal strength in dBm, A is the received signal strength in dBm at 1 meter, and n is path-loss exponent (e.g. path-loss exponent of air is 2). In some examples, A and n are calibratable values.

If the locations of the WLAN nodes 102 are not known (e.g., not included in the navigation data), the location tracker 110 uses SLAM techniques to build a map of the locations of the WLAN nodes 102 and locate the vehicle 100 based on that map. From time-to-time (e.g., periodically, aperiodically), the location tracker 110 estimates the location of the vehicle 100 based on (a) the last known location (e.g., from the GPS receiver) or (b) the latest estimated location. Initially, to estimate the location of the vehicle 100, the location tracker 110 predicts the current location of the vehicle 100 based on (a) a motion model, (b) the speed of the vehicle 100 measured by the vehicle speed sensor 108, and (c) the last known location or the latest estimated location. In some examples, the motion model estimates the current location of the vehicle 100 based on (a) a Δt (the interval of time between location predictions), (b) the speed of the vehicle 100 (e.g., the average speed during Δt), and (c) factors that account for (i) measurement inaccuracy and (ii) speed uncertainty. In some examples, the motion model also includes change in orientation of the vehicle 100 (e.g., as measured by a steering wheel angle sensor). The location tracker 110 scans for the WLAN nodes 102 and determines the distances (d) to the WLAN nodes.

The location tracker 110 uses a Bayesian filter (e.g., an extended Kalman filter) to determine the estimated current location of the vehicle 100 based on the estimated location of the motion model and the distances (d) of the WLAN nodes 102. The Bayesian filter resolves the balance between the determined distances and the estimated location. The location tracker 110 updates the map the predicted pose of the vehicle 100 and the likely locations of the WLAN nodes 102 (e.g., based on confidence intervals provided by the Bayesian filter). In some examples, the location tracker 110 stores the predicted locations of the WLAN nodes 102 with their identifiers with the navigation data of the navigation system. Additionally, in some such examples, the location tracker 110, via the on-board communications platform 104, uploads the predicted locations of the WLAN nodes 102 with their identifiers to a navigation data server on an external network to be shared with other vehicles.

If the locations of the WLAN nodes 102 are known, the location tracker 110 uses particle filtering techniques. Initially, the location tracker 110 determines the last known coordinates (e.g., via the GPS receiver) of the vehicle 100. The location tracker generates particles around the last known coordinates of the vehicle 100. Each particle is associated with a set of coordinates and represents a hypothesis of where the vehicle 100 could currently be located. The particles are distributed around the vehicle 100 based on the speed of the vehicle 100. For example, the radius of around the vehicle 100 in which the particles are distributed may be proportional with speed of the vehicle 100. The particles are distributed (a) randomly within the area using a Monte Carlo method, (b) evenly throughout the area, or (c) logarithmically throughout the area. In some examples, based on navigation data provided by the navigation system 106, the location tracker 110 distributes the particles so that the coordinates associated with the particle are at locations at which the vehicle 100 could be expected (e.g., roadways, driveways, parking lots, etc.).

The location tracker 110 scans for the WLAN nodes 102. For each particle, location tracker 110 determines, for each WLAN nodes 102 that sent the probe responses 114, (a) a first distance from the particle to the WLAN node 102 based on the coordinates of the particle and the coordinates of the wireless location area network node, and (b) a second distance to the WLAN node 102 based on the corresponding RSS measurement. For each particle, the location tracker 110 assigns a weight based on the first and second distances. The weight is indicative of the likelihood that the location of the particle is the actual location of the vehicle 100. Based on the weights, the location tracker 110 updates the pose (e.g., the location and orientation) of the vehicle 100.

Subsequently, based on the weights, the location tracker 110 resamples the particles. To resample, the location tracker 110 distributes a same number of new particles according to the weights of the old particle. The new particles are distributed so that more of them are distributed around the old hypothesis the greater weight. As a result, some locations may be associated with more than one new particle and some locations of the old particles may not be associated with any new particles. Additionally, all the weights of the new particles are equalized. The location tracker 110 applies the motion model individually to each of the new particles. Because the motion model incorporates uncertainty regarding the motion of the vehicle 100, the new particles that were initially in the same location may be moves to different locations. The location tracker 110 (a) scans for the WLAN nodes 102, (b) calculates the first and second distances for each of the new particles, (c) assigns weights to the new particles based on the first and second distances, and (d) updates the pose (e.g., the location and orientation) of the vehicle 100.

Figure 2A:
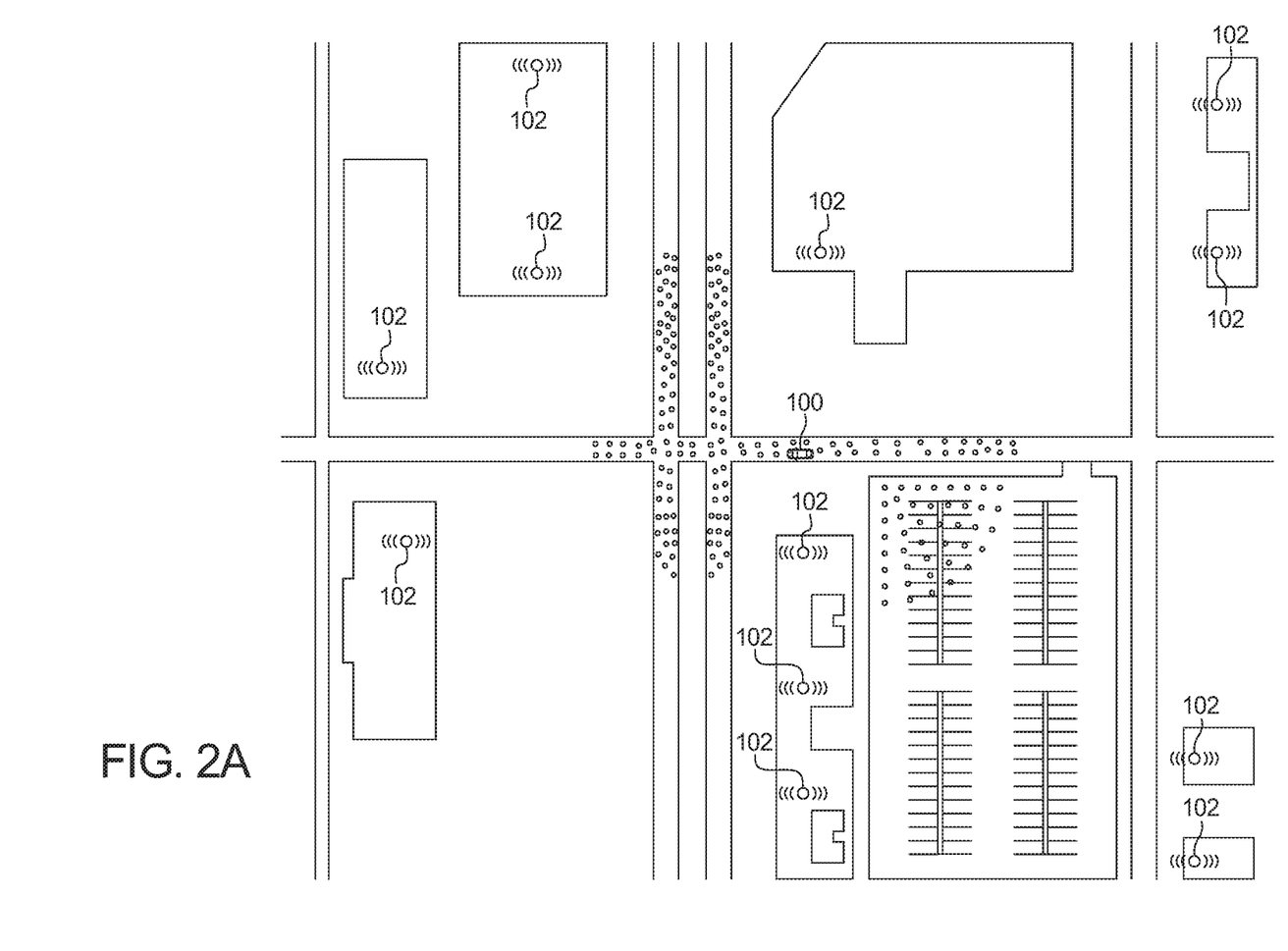
FIGS. 2A, 2B, and 2C illustrates an example of the location tracker of FIG. 1 determining the location of the vehicle based on messages received from the wireless local area network nodes.
Figure 2B:
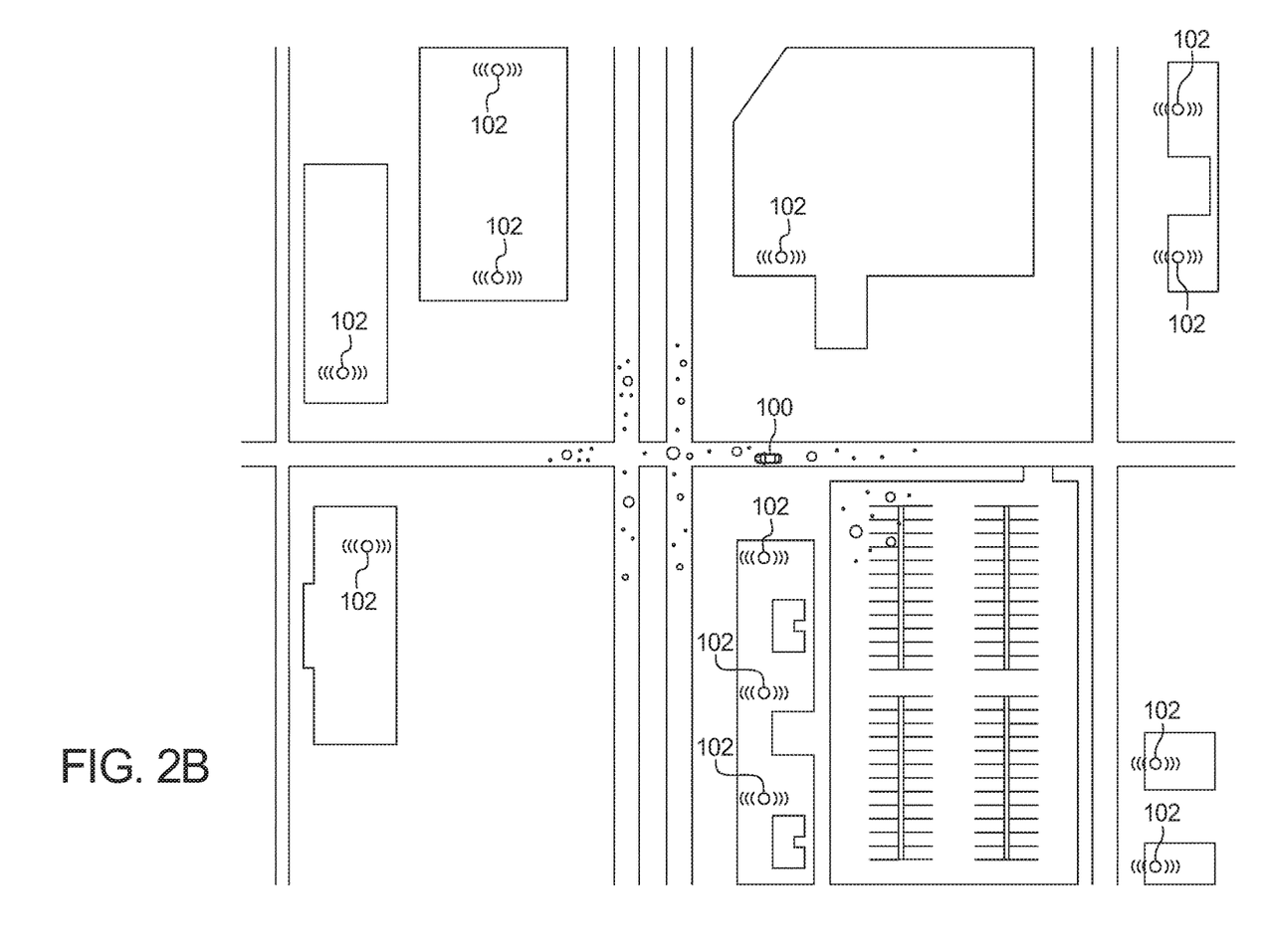
Figure 2C:
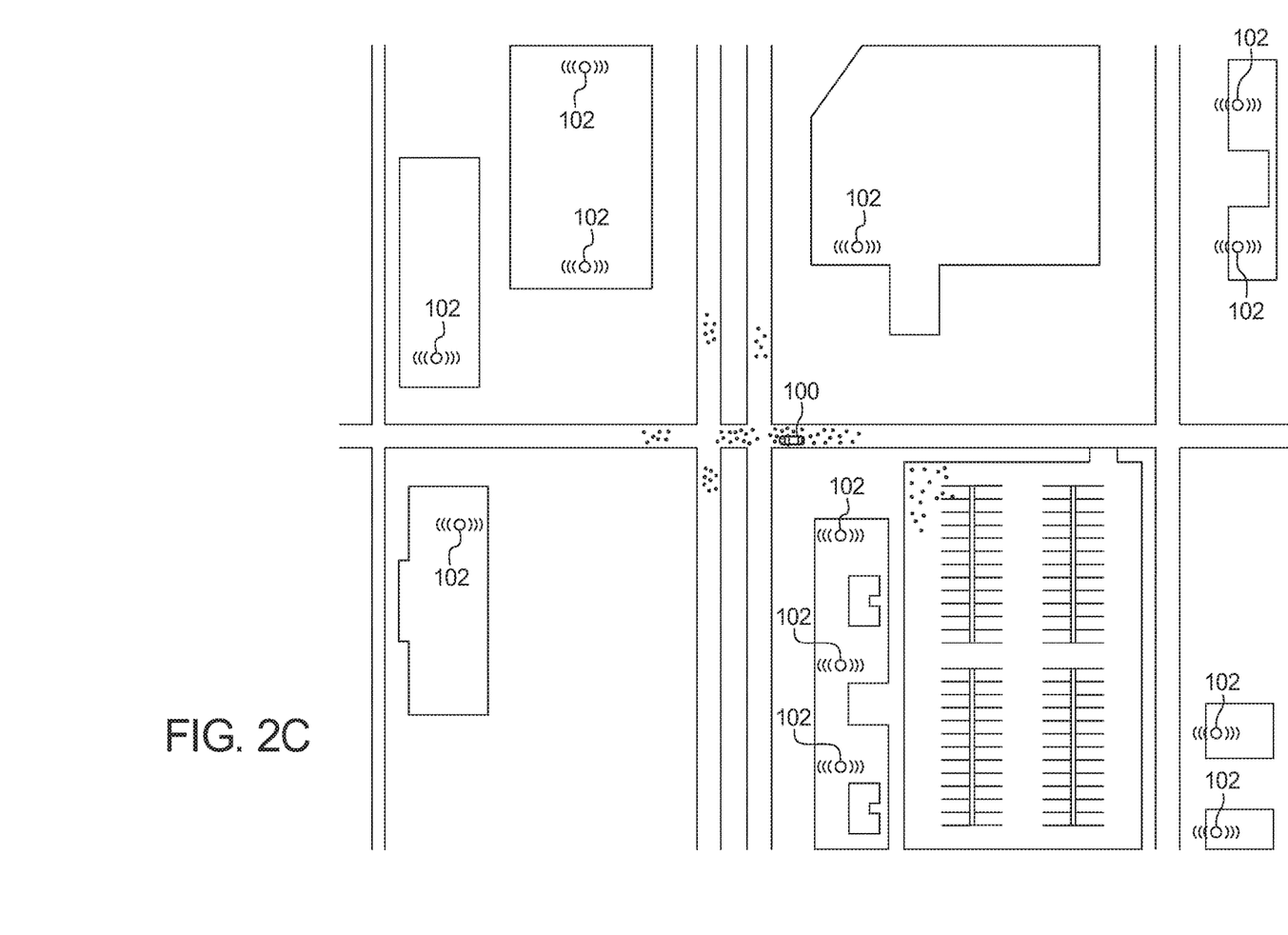

FIGS. 2A, 2B, and 2C illustrates an example of the location tracker 110 determining the location of the vehicle 100 based on messages received from the WLAN nodes 102. In FIGS. 2A, 2B, and 2C, the vehicle 100 is traversing a roadway with several nearby WLAN nodes 102. In FIG. 2A, at a second time, the location tracker 110 generates particles around the last known location of the vehicle 100 at a first time. In FIG. 2A, the particles are depicted as small circles. In the illustrated example, the location tracker 110 constrains the locations of the particle to roadways, driveways, and/or parking lots, etc. based on the navigation data. The location tracker 110 scans for the WLAN nodes 102. In FIG. 2B, the location tracker 110 assigns weights to the particles based on (i) the location of the particle, (ii) the location of the WLAN nodes 102, and (iii) the RSS measurement in the probe response 114 from the WLAN nodes 102. In FIG. 2B, the weights of the particles are depicted as circles of different sizes. In FIG. 2C, at a third time, the location tracker 110 resamples the particles and applies the motion model of the vehicle 100 to the resampled particles.

Figure 3:
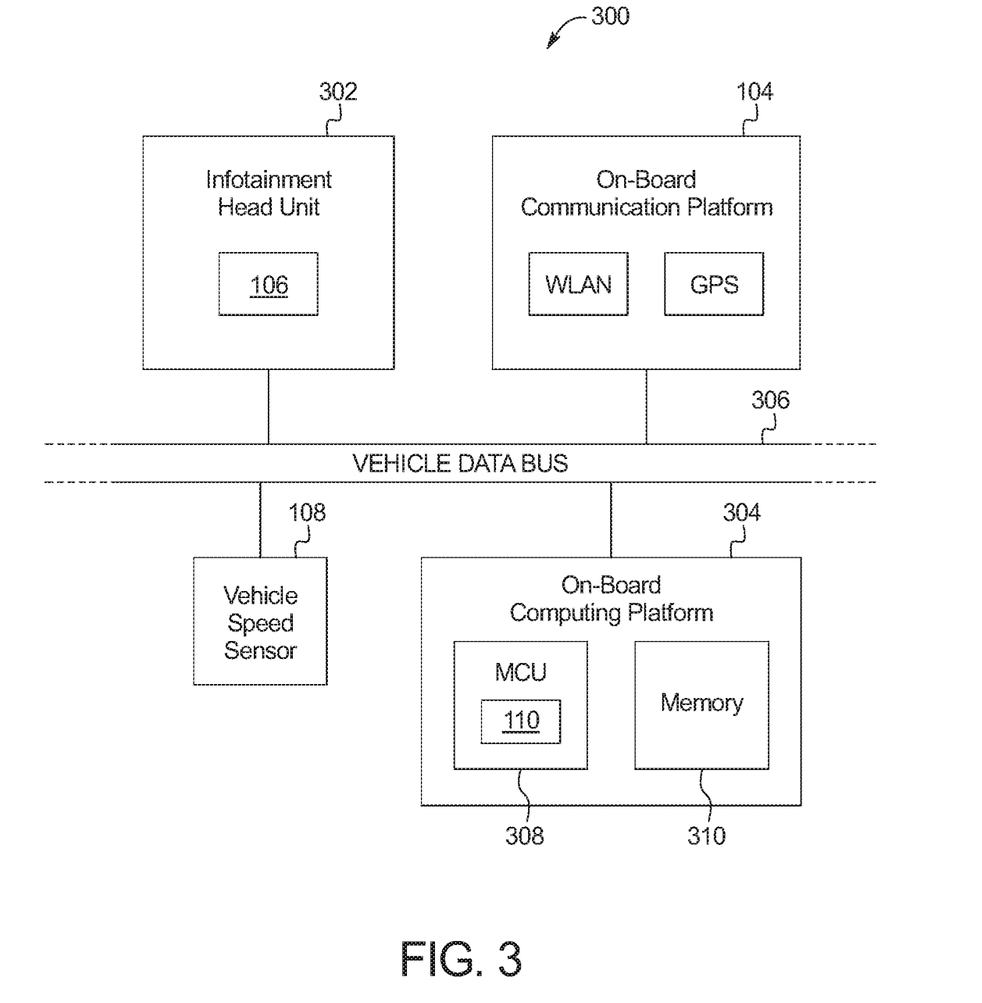
FIG. 3 is a block diagram of electronic components of the vehicle of FIGS. 1 and 2A, 2B, 2C.

FIG. 3 is a block diagram of example electronic components 300 of the vehicle 100 of FIGS. 1 and 2A, 2B, 2C. In the illustrated example, the electronic components include the on-board communications platform 104, the vehicle speed sensor 108, an infotainment head unit 302, an on-board computing platform 304, and a vehicle data bus 306.

The infotainment head unit 302 provides an interface between the vehicle 100 and a user. The infotainment head unit 302 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 302 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.) than includes the navigation system 106. Additionally, the infotainment head unit 302 displays the infotainment system with the navigation system 106 on, for example, the center console display.

The on-board computing platform 304 includes a processor or controller 308 and memory 310. In the illustrated example, the on-board computing platform 304 is structured to include location tracker 110. The processor or controller 308 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 310 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 310 includes multiple kinds of memory, particularly volatile memory and non-volatile memory.

The memory 310 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 310, the computer readable medium, and/or within the processor 308 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The vehicle data bus 306 communicatively couples the on-board communications platform 104, the vehicle speed sensor 108, the infotainment head unit 302, and the on-board computing platform 304. In some examples, the vehicle data bus 306 includes one or more data buses. The vehicle data bus 306 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
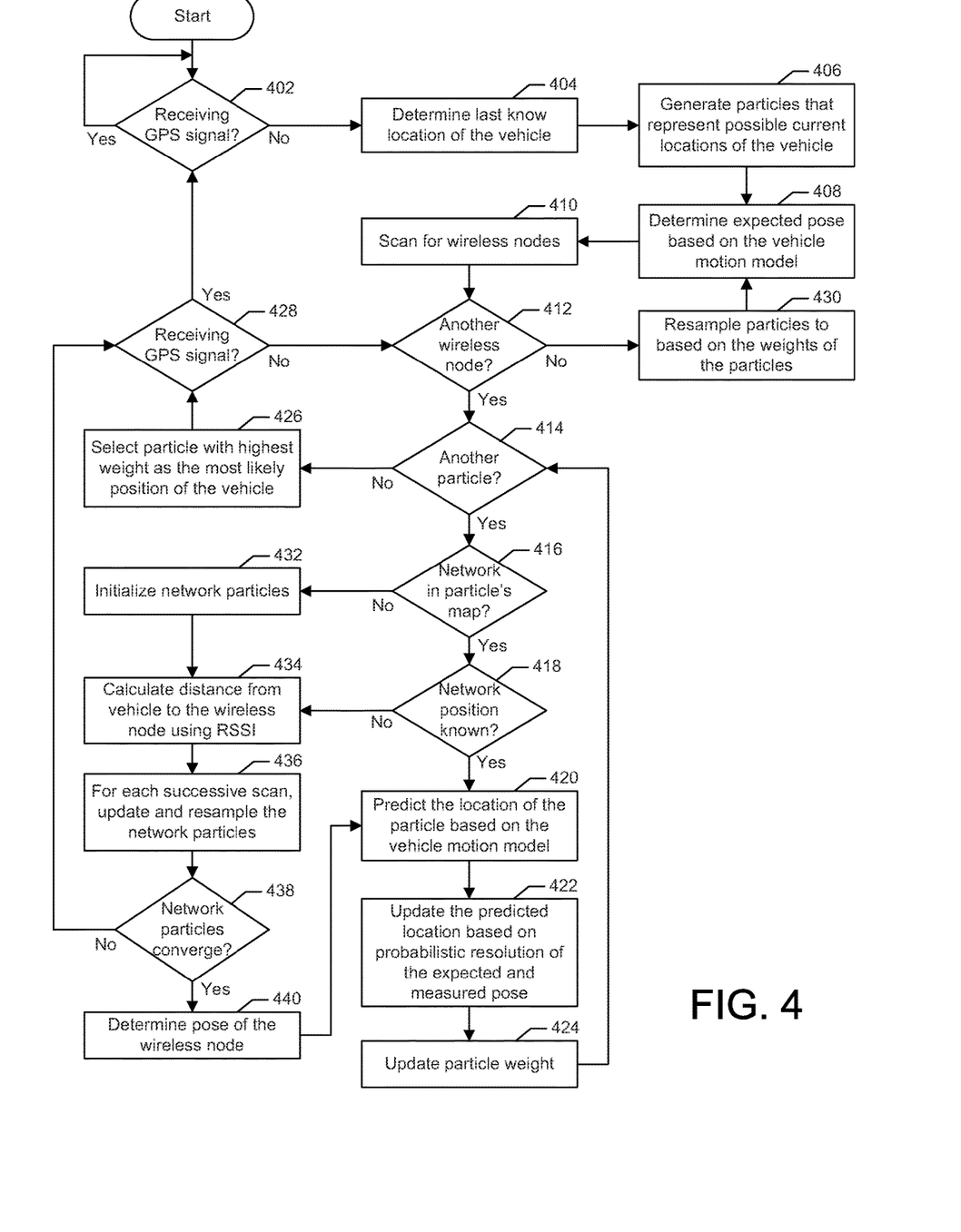
FIG. 4 is a flowchart of a method to determine the location of the vehicle of FIGS. 1 and 2A, 2B, 2C, which may be implemented by the electronic components of FIG. 3.

FIG. 4 is a flowchart of a method to determine the location of the vehicle of FIGS. 1 and 2A, 2B, 2C, which may be implemented by the electronic components of FIG. 3. Initially, at block 402, the location tracker 110 waits until the vehicle 100 is not receiving signals from GPS satellites so that the GPS receiver cannot determine the location of the vehicle 100. At block 404, the location tracker 110 determines the last known location of the vehicle 100. For example, the location tracker 110 may use the most recent coordinates from the GPS receiver. At block 406, the location tracker 110 generates particles that represent possible current locations of the vehicle 100. For example, the location tracker 110 may generate hundreds or thousands of particles depending on how large an areas that covers the possible current locations of the vehicle 100 (e.g., based on the speed of the vehicle 100). At block 408, the location tracker 110 determines an expected pose (e.g., location and orientation) of the vehicle 100 bases on the vehicle motion model.

At block 410, the location tracker 110 scans the WLAN nodes 102 via the on-board communications platform 104. At block 412, the location tracker 110 determines whether there is another WLAN node 102 to analyze. If there is another WLAN node 102 to analyze, the method continues to block 414. Otherwise, if there is not another WLAN node 102 to analyze, the method continues to block 430. At block 414, the location tracker 110 determines if there is another particle to analyze. If there is another particle to analyze, the method continues to block 416. Otherwise, if there is not another particle to analyze, the method continues to block 426. At block 416, the location tracker 110 determines if the WLAN node 102 being analyzed is in the map of the particle being analyzed. For example, the location tracker 110 determines whether the network particles have been generated to determine the location of the WLAN node 102 being analyzed. If the WLAN node 102 being analyzed is in the map of the particle being analyzed, the method continues to block 418. Otherwise, if the WLAN node 102 being analyzed is not in the map of the particle being analyzed, the method continues at block 432.

At block 418, the location tracker 110 determines whether the location of the WLAN node 102 being analyzed has been determined (e.g., via particle filtering of for the location of the WLAN node 102 starting at block 432, included in the navigation data, etc.). If the location of the WLAN node 102 being analyzed has been determined, the method continues at block 420. Otherwise, if location of the WLAN node 102 being analyzed has not been determined, the method continues at block 434. At block 420, the location tracker 110 predicts the location of the particle being analyzed one on the vehicle motion model. At block 422, the location tracker 110 updates the predicted location of the particle based on the probabilistic resolution of an expected pose (e.g., based on the received signal strength from the WLAN node 102 being analyzed) and the measured pose (determined at block 420) of the particle. In some examples, the location tracker 110 updates the predicted location of the particle based on a Kalman filter. At block 424, the location tracker 110 updates the weight of the particle being analyzed based on the received signal strength from the WLAN node 102 being analyzed. In some examples, the weight is based on a difference between (a) the calculated distance between the WLAN node 102 and the particle filter calculated with their respective coordinates, and (b) the distance calculated based on the received signal strength (e.g., using Equation (1) above). The method then continues to block 414.

At block 426, the location tracker 110 selects the particle with the highest weight as the most likely position of the vehicle 100. At block 428, the location tracker determines whether vehicle 100 is receiving signals from the GPS satellites so that the GPS receiver can determine the location of the vehicle 100. If the GPS signal is being received, the method returns to block 402. Otherwise, if the GPS signal in not being received, the method continues to block 412.

At block 430, the location tracker 110 resamples the particles based on the assigned weights after the received signal strengths from the WLAN nodes 102 have been analyzed. The location tracker resamples the weights so that the same numbers of particles are generated as are generated at block 406.

At block 432, the location tracker 110 generates network particles for the WLAN node 102 being analyzed. At block 434, the location tracker 110 calculates the distance between the vehicle and the WLAN node 102 being analyzed based on the received signal strength. In some examples, the distance is calculated in accordance with Equation (1)

above. At block 436, the location tracker 110 updates weights and resamples the network particles associated with the WLAN node 102 being analyzed. At block 438, the location tracker determines whether the network particles associated with the WLAN node 102 being analyzed have converged to a location. If the network particles associated with the WLAN node 102 being analyzed have converged to a location the method continues to block 440. Otherwise, if the network particles associated with the WLAN node 102 being analyzed have not converged to a location, the method continues to block 428. At block 440, the location tracker 110 determines the pose (e.g., the location and orientation) of the WLAN node 102 being analyzed. In some examples, the location tracker 110 adds the location the WLAN node 102 to the navigation data. In some such examples, the location tracker 110, via the on-board communications platform 104, uploads the location of the WLAN node 102 to a server. The method then continues to block 420.

The flowchart of FIG. 4 is representative of machine readable instructions stored in memory (such as the memory 310 of FIG. 3) that comprise one or more programs that, when executed by a processor (such as the processor 308 of FIG. 1), cause the vehicle 100 to implement the example location tracker 110 of FIGS. 1 and 3. Further, although the example program(s) is/are described with reference to the flowchart illustrated in FIG. 4, many other methods of implementing the example location tracker 110 may alternatively be used. For example, the order of execution of the blocks may be changed, and/or some of the blocks described may be changed, eliminated, or combined In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method to determine a current location of a vehicle comprising:
   in response to losing reception of GPS signals:
      scanning for wireless network nodes via a wireless network controller;
      when first locations of the wireless network nodes are stored in memory, determining, with a processor, the current location of the vehicle based on a particle filtering technique and received signal strength measurements from the wireless network nodes; and
      when using the particle filtering technique, assigning weights to particles based on the first locations of the wireless network nodes and the received signal strength measurements from the wireless network nodes.

2. The method of claim 1, including, when the first locations of the wireless network nodes are not stored in the memory, determining the current location of the vehicle based on a simultaneous localization and mapping technique and the received signal strength measurements from the wireless network nodes.

3. The method of claim 2, including, when the first locations of the wireless network nodes are determined via the simultaneous localization and mapping technique, storing the locations of the wireless network nodes in the memory.

4. The method of claim 1, wherein the particles represent possible coordinates of the current location of the vehicle.

5. The method of claim 4, wherein the possible coordinates for the particles are constrained by navigation data stored in the memory.

6. A tangible computer readable medium comprising instructions that, when executed by a processor, cause a vehicle to:
   in response to losing reception of GPS signals:
      scan for wireless network nodes via a wireless network controller;
      when first locations of the wireless network nodes are stored in memory, determine a current location of the vehicle based on a particle filtering technique and received signal strength measurements from the wireless network nodes;
      when the first locations of the wireless network nodes are not stored in the memory, determine the current location of the vehicle based on a simultaneous localization and mapping technique and the received signal strength measurements from the wireless network nodes; and
      when using the particle filtering technique, assign weights to particles based on the first locations of the wireless network nodes and the received signal strength measurements from the wireless network nodes.

7. The computer readable medium of claim 6, including, when the first locations of the wireless network nodes are determined via the simultaneous localization and mapping technique, store the locations of the wireless network nodes in the memory.

8. The computer readable medium of claim 6, wherein the particles represent possible coordinates of the current location of the vehicle.

9. The computer readable medium of claim 8, wherein the possible coordinates for the particles are constrained by navigation data stored in the memory.

10. A vehicle comprising:
    a wireless network controller; and
    a processor configured to, in response to losing reception of GPS signals:
       scan for wireless network nodes via the wireless network controller; and
       when first locations of the wireless network nodes are stored in memory, determine a current location of the vehicle based on a particle filtering technique and received signal strength measurements from the wireless network nodes, wherein, the processor is further configured to, when using the particle filtering technique, weigh particles based on the first locations of the wireless network nodes and the received signal strength measurements from the wireless network nodes.

11. The vehicle of claim 10, wherein the processor is further configured to, when the first locations of the wireless network nodes are not stored in the memory, determine the current location of the vehicle based on a simultaneous localization and mapping technique and the received signal strength measurements from the wireless network nodes.

12. The vehicle of claim 11, wherein the processor is further configured to, when the first locations of the wireless network nodes are determined via the simultaneous localization and mapping technique, store the first locations of the wireless network nodes in the memory.

13. The vehicle of claim 10, wherein the particles represent possible coordinates of the current location of the vehicle.

14. The vehicle of claim 13, wherein the possible coordinates for the particles are constrained by navigation data stored in the memory.

* * * * *